United States Patent
Peña May

[11] 3,943,352
[45] Mar. 9, 1976

[54] LUMINOUS SAFETY DEVICE FOR DOORS OF VEHICLES

[76] Inventor: Guillermo Peña May, Manuel Gonzales 114 - A Unidad Tlatelolco, Mexico City, Mexico

[22] Filed: Oct. 29, 1974

[21] Appl. No.: 518,323

[30] Foreign Application Priority Data
June 26, 1974 Mexico .............................. 152152

[52] U.S. Cl. ............ 240/7.1 R; 240/2.13; 240/1 EL; 240/10 L
[51] Int. Cl.² ........................................ B60Q 1/00
[58] Field of Search .............. 240/7.1 R, 2.13, 1 LP, 240/1 EL, 2, 10 L, 1 R; 340/63, 274

[56] References Cited
UNITED STATES PATENTS

| | | | |
|---|---|---|---|
| 1,799,351 | 4/1931 | Bell | 240/7.1 R |
| 1,949,155 | 2/1934 | Fenzlein | 240/7.1 R |
| 3,478,199 | 11/1969 | Brock | 240/2.13 |

*Primary Examiner*—Monroe H. Hayes
*Attorney, Agent, or Firm*—Ladas, Parry, Von Gehr, Goldsmith & Deschamps

[57] ABSTRACT

A luminous safety device for vehicle doors which includes a push-pull button of electrical insulating material, the head having transparent walls and a sleeve portion connected to an actuating rod of the door-locking mechanism, said rod being connected to ground and making contact with one of the poles of a lamp placed within the interior of the head of the button, said lamp having its other pole connected to an electrically conducting ring mounted on the outer surface of the sleeve portion of the button, said ring making contact with a conducting projection inserted in an insulating shell which surrounds the button and which is secured by its upper edge in the orifice in the door in which the actuating button slides; and because the conducting projection is connected to a source of energy, when the button is pulled and contact is made between the button conducting ring and the conducting projection the lamp is energized and lights, indicating clearly that the door-locking safety has not been engaged.

7 Claims, 4 Drawing Figures

LUMINOUS SAFETY DEVICE FOR DOORS OF VEHICLES

BACKGROUND OF THE INVENTION

Up to the present time no luminous devices have existed to indicate that a vehicle door is closed with its safety lock engaged, for which reason numerous accidents have occurred to children and adults by the unforeseen opening of a door, or by such contingencies as a crash or overturning of the vehicle when in motion, as well as thefts of articles left inside the vehicle in which the door lock was not engaged through oversight of the vehicle user.

Up to the present time, the only way to determine if the door-lock is engaged in a vehicle door has been to look at the head or upper end of the rod or button for engaging the lock, to see if it is in the upper or lower position; if by means of a lamp or luminous indication the attention of the user of the vehicle could be attracted to indicate to him that the door lock has not been set, a great number of accidents would be eliminated, as well as theft not only of articles left inside the vehicle, but of the vehicle itself as well.

SUMMARY OF THE INVENTION

In view of the foregoing it is an object of this invention to provide a luminous means for attracting the attention of the user of a vehicle when the door safety lock is not engaged.

Another object of this invention is to provide a luminous button as the actuator of the door-locking pin of vehicles doors, which is energized or de-energized depending on whether or not the safety lock is engaged or not.

Still another object of this invention is to provide a button for actuating the rod which engages the lock of vehicle doors, in which is included a light-reflecting surface so as to indicate to the vehicle user visibly or by luminous reflection whether the safety lock or the door is engaged or not.

The invention includes a simple circuit which permits replacement of the actuating button of the rod which engages the safety lock with a bulb or luminous button which is energized or not depending on whether or not the safety lock is engaged.

One embodiment of the invention includes a shell or cylinder connected at its upper end to the orifice in vehicle doors through which the safety lock button projects; inside the said shell slides a button connected to the threaded portion of the rod which actuates the safety lock, said button including a conducting ring at its lower end connected to one of the poles of a lamp mounted in a space inside the head of the button, and having its other pole electrically connected to the safety lock rod, which is connected to ground. The shell in which the actuating button of the safety lock rod slides includes an electrically conducting projection which is connected to a power source of the vehicle; this electrically conducting projection stands out in the interior of the shell in such a manner as to coincide with and bear against the conducting ring extending out from the bottom of the actuating button of the safety lock rod, either when the safety lock has been set or when it has been disengaged, and thereby when the ring coincides with the projection, the lamp of the button will light as the circuit is closed.

In another embodiment of the invention, instead of the actuating button of the safety lock rod of vehicles doors having a space in its head for locating a lamp within, the whole button which can be mounted on the rod is itself a lamp; that is to say, the head of the button instead of housing a lamp contains the incandescent filament thereof directly mounted. Naturally, in both embodiments a part or all of the head of the button should be translucent to permit the passage of the light of the bulb or of the incandescent filament, and may also contain, in order to assure a good electrical contact between the safety lock rod and one pole of the bulb, a spring conductor which serves in addition as a stop for the threaded portion of the threaded safety lock rod as it penetrates into the bulb.

In another embodiment of the invention the shell of the preceding embodiments is not required and the actuating button of the safety lock rod should have an outer diameter practically the same as that of the orifice in the door in which it slides so that it rubs therein as it is moved upward and downward, and formed into the insulating material of the said button is a ring which is an electrical conductor standing out slightly from the exterior walls of the button and electrically connected to one pole of a lamp housed in the inside of the head of the button which actuates the safety lock rod, a portion or the entire wall of said head being translucent, the other pole of the lamp being electrically connected to an electrically conducting ring partially embedded in to and partially outstanding from the bottom of the actuating button of the safety lock rod, this ring being so placed that when the actuating button is screwed onto the threaded portion of the said safety lock rod, it bears against a similar and coinciding ring which is insulatedly mounted on said safety lock rod; said latter ring insulatedly mounted on safety lock rod is connected to a source of energy, whereby such energy is fed to the lamp and thence to the first conducting ring above mentioned, which coincides in one of its two positions as it engages or releases the safety lock rod with the edge of the orifice in the door which is connected to ground, whereby in that one of the cited positions in which the conducting ring makes contact with the edge of the orifice, the lamp will be lighted and in the other position it will be out.

Another embodiment of the invention consists simply of an actuating button of the safety lock rod which is translucent with an internal reflective covering in the upper part of the head, which transmits by reflection the lighting of a lamp located inside the door, energized by a switch which is actuated by the safety lock mechanism of the door in such a manner that when the safety lock rod is raised or lowered and said lamp is energized or de-energized thus indicating by luminous reflection to the user if the safety is on or not.

These and other objects to be attained through the use of this invention will be more fully understood and appreciated in the text of the following description which refers to the drawings of the preferred embodiments thereof.

DETAILED DESCRIPTION OF THE INVENTION

Figure 1:
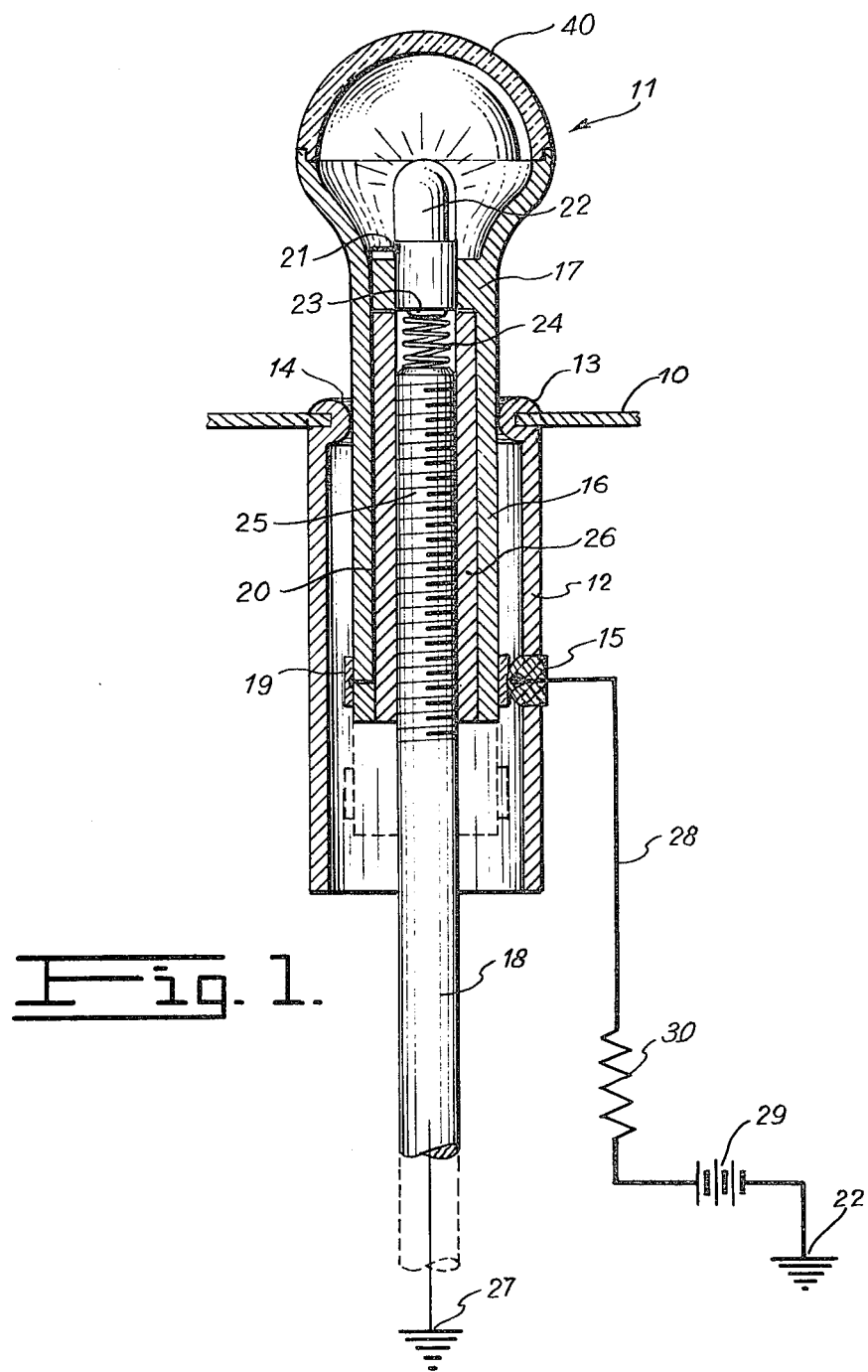
FIG. 1 is a semi-schematic view of one embodiment of the luminous safety device of the present invention which comprises an actuating button for the safety lock rod of vehicle doors, in a conventional lengthwise section; in this embodiment there is included a shell in addition to the button and a lamp is located inside the head of the button with its walls being partially or entirely translucent; in addition the electric circuit for lighting the lamp is schematically shown.

The embodiment of the luminous safety device of the present invention 11, illustrated in FIG. 1, includes a shell or hollow cylinder 12 composed of insulating material and secured by its upper end 13 in the rim 14 of door 10 of a vehicle which is partly shown, said shell 12 having inserted in it electrically conductive strip 15 a portion of which projects inside the shell.

Within shell 12 there slides up and down a sleeve 16 which constitutes the lower portion of button 17 actuating rod 18 to apply or disengage the safety lock of the door of the vehicle. Sleeve 16 composed of electrically insulating material has at its lower end and mounted on its outer wall electrically conductive ring 19 which, either in its lower or its upper position, as illustrated in FIG. 1, makes electrical contact with strip 15 extending inwardly of shell 12, said ring 19 connecting with electrical conductor 20, with pole 21 of lamp 22 of which the other pole 23 is electrically connected by spring means 24 to the upper end of rod 18 which actuates the safety lock, said rod 18 having its upper end 25 threaded and connected to the hollow inner portion of the bottom end of button 17. Since conductor 20 which connects conducting ring 19 with pole 21 of lamp 22 should be insulated from rod 18, said conductor 20 must be sunk into the wall of the lower end of button 17 and pass through an orifice therein, or otherwise as shown in FIG. 1 pass through the inside wall of sleeve 16 and the outside wall of a second internal sleeve 26, within which rod 18 is threadedly mounted.

Since rod 18 is connected to ground 27 when ring 19 makes contact with strip 15, as is illustrated in FIG. 1, an electric circuit is closed from ground 27 through safety lock actuating rod 18, spring 24 and pole 23 of lamp 22, other pole 21 thereof, electrical conductor 20, conducting ring 19, strip 15 connected by conductor 28, to a source of power 29, thus lighting lamp 22. In FIG. 1 it is shown that lamp 22 lights when safety lock actuating rod 18 is in its upper position, that is, when the safety is on. The lighted condition of the lamp can of course be inverted by simply changing the position of conducting strip 15; the electric circuit may include a regulating resistance 30 or some other control element.

Figure 2:
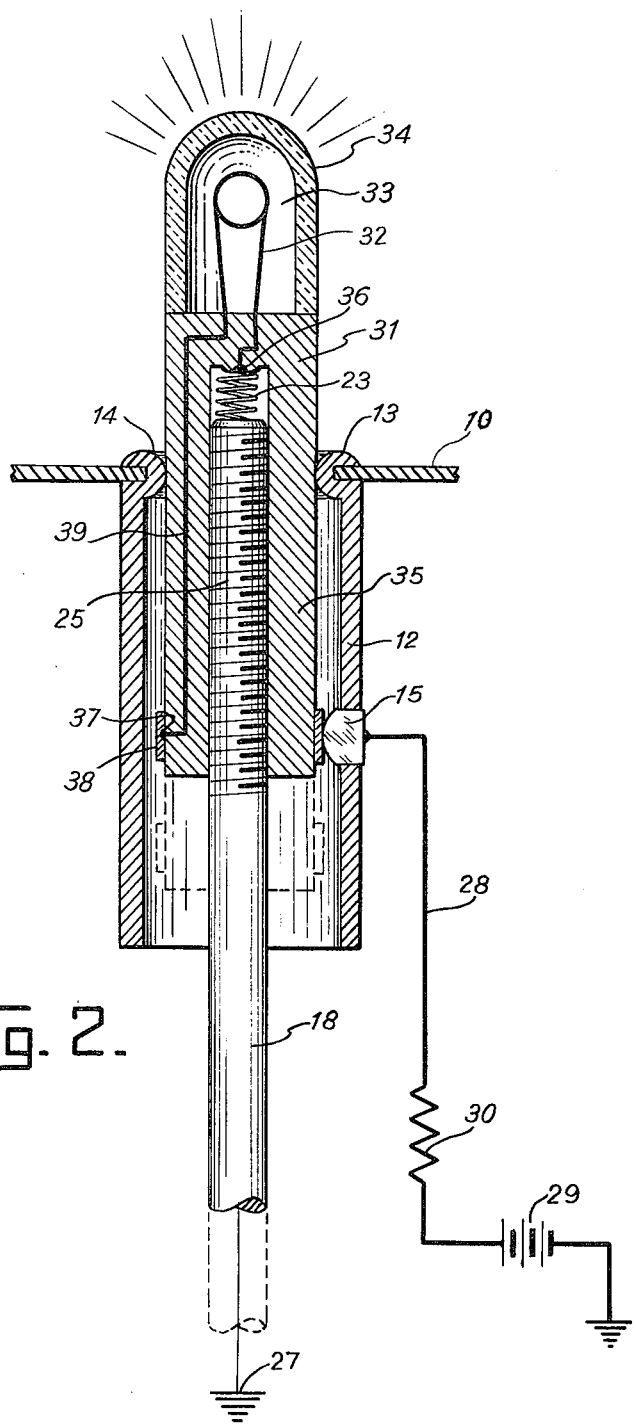
FIG. 2 is a view in conventional lengthwise section similar to that of FIG. 1, of an embodiment of the invention in which the actuating button of the safety lock is an integral lamp with translucent head and incandescent filament located in its interior.

The embodiment illustrated in FIG. 2 of the luminous safety device of the present invention, in addition to shell 12 of insulating material mounted by its upper end 13 on the rim of orifice 14 of door 10 of a vehicle, partly shown, and electrical conducting strip 15 of which a portion projects inside of shell 12 and which is connected by means of conductor 28 to a power source 29, also includes lamp 31 which comprises an incandescent filament 32 within a housing 33 whose walls 34 are wholly or partially translucent and the lower end of which includes a tube or sleeve receptacle 35 which is directly attachable to the upper threaded portion 25 of safety lock rod 18 which in turn is connected to ground 27; said incandescent filament 32 has its other pole 37 connected to conducting metal ring 38 by means of conducting portion 39 thereof which is embedded in receptacle or sleeve 35. Said ring 38 projects from the outside surface of sleeve 35 near the lower end thereof in such fashion that either in the upper position of safety lock actuating rod 18 as illustrated in FIG. 2 or in the corresponding lower position thereof it makes electric contact with the strip 15 which projects into the inside of shell 12, thus closing the circuit and causing the lamp to light.

In the embodiment illustrated en FIG. 1, lamp 22 can be replaceable, by making portion 40 of the wholly or partially translucent head of button 17 removable, which is not possible in the embodiment of FIG. 2, because if filament 32 of lamp 31 burns out the entire unit must be replaced and not just lamp 22 as in the embodiment illustrated in FIG. 1.

Figure 3:
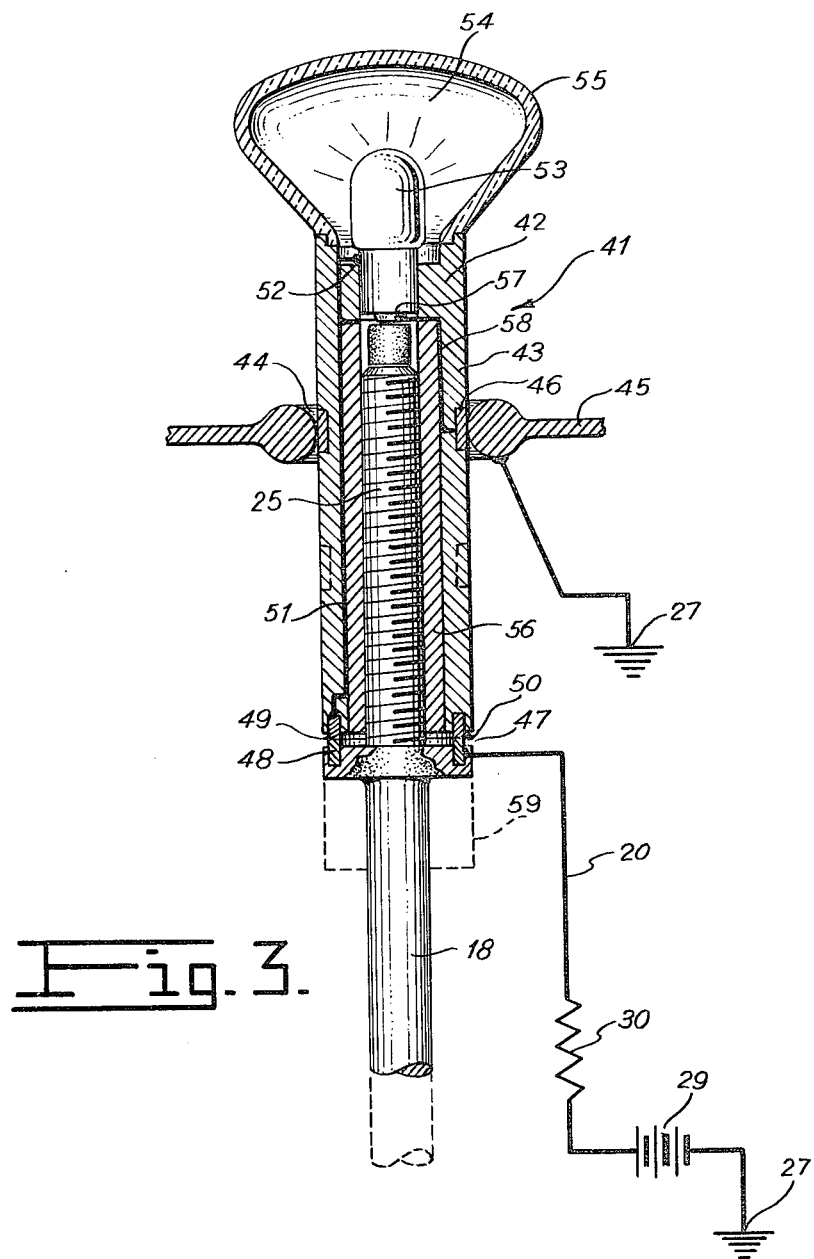
FIG. 3 is a view in conventional lengthwise section similar to that of FIGS. 1 and 2 of an embodiment which does not require a shell and in which the electric circuit of the lamp is completed with the edge of the hole in the door through which the actuating button of the safety lock slides.

FIG. 3 shows an embodiment of the invention which does not require shell 12 with strip 15 of the preceding embodiments. In this embodiment luminous safety device 41 is composed of button 42 to actuate rod 18, which engages or disengages the safety lock of the door of a vehicle, with a lower portion or tubular sleeve 43 which has an outside diameter practically the same as that of orifice 44 of door 45, partially shown, of vehicle in which the invention is applied. Said lower portion or sleeve 43 has an electrically conductive ring 46 embedded in it and extending slightly beyond its outer diameter, which ring makes contact with the inner edge of orifice 44 above mentioned, either in the lower or in the upper position of rod 18 which actuates the safety lock, as indicated en FIG. 3.

The said rod 18 includes at a certain level a fixed support 47 composed of insulating material and projecting radially outward, in which is partially embedded ring 48 which is spaced from and concentric with rod 18, said ring 18 standing out slightly from the upper face of support 47 in such a manner that, when button 42 is screwed onto the threaded upper portion 25 of rod 18, another ring 49 like ring 48 already described makes direct contact with ring 48, so that they practically form a single ring, latter ring 49 being embedded in the lower edge 50 of the tubular portion or sleeve 43 of button 42. In turn, said electrically conducting ring 49 is connected by means of an electrical conductor 51 with pole 52 of a lamp 53 housed inside a space 54 in head 55 of button 42. This head 55 has sides which are totally or partially translucent.

Conductor 51 which connects ring 49 with pole 52 of the lamp must be insulated from rod 18, and hence is embedded in the walls of the lower portion or sleeve 43 of button 42, or alternatively passes through an orifice extending the length of these latter pieces; or, as indicated in FIG. 3, it passes between the inside wall of sleeve 43 and the outside wall of a second internal sleeve 56, which is the one to be coupled to the upper threaded portion 25 of rod 18 actuating the safety lock.

The other pole 57 of the lamp is connected by means of electrical conductor 58 to electrically conducting ring 46 which in one of the two positions of button 42 makes direct contact with orifice 44 of door 45 which is connected to ground 27, in this way closing the electrical circuit to light lamp 53 of this embodiment by means of the energy source 29, passing through some control resistance element 30, electrical conductor 58, ring 46, orifice 44 of door 45, and ground 27. Thus bulb 53 will light when the safety lock is not engaged and will go out when it is engaged, that is, when button 42 is pushed to the position indicated with dotted lines 59.

Figure 4:
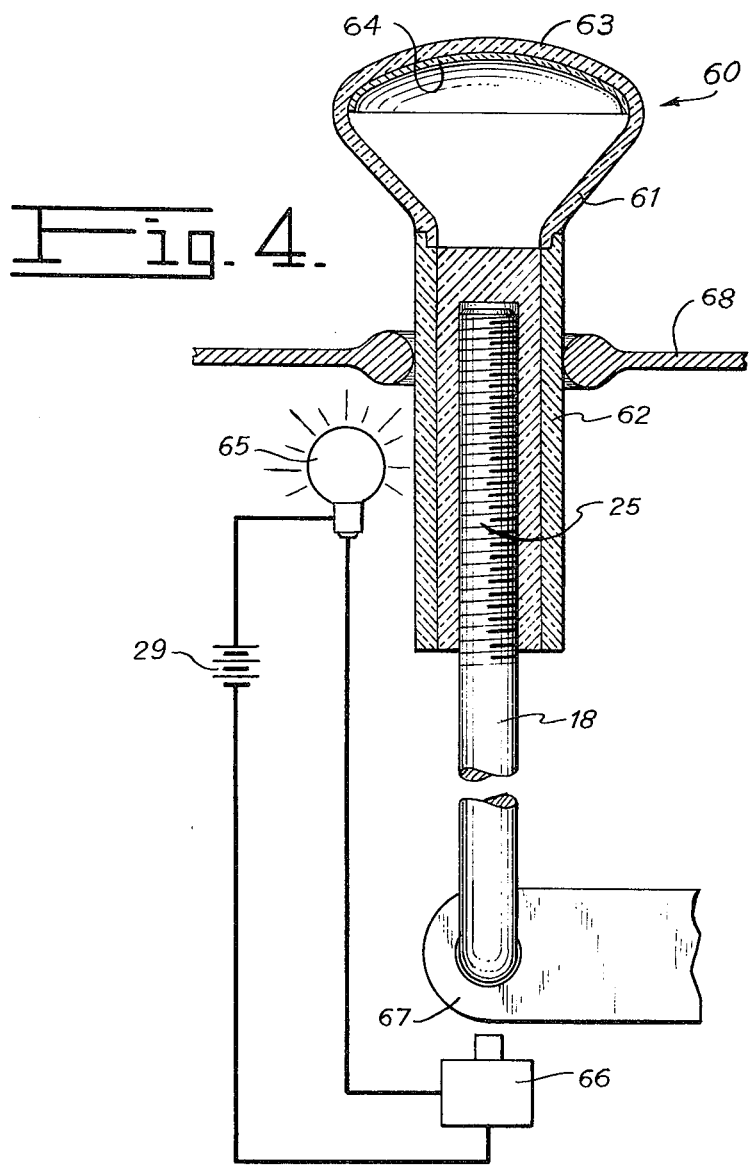
FIG. 4 is a view in conventional lengthwise section similar to that of FIGS. 1 to 3, which illustrates an embodiment in which the indicating bulb is outside of the actuating button of the safety lock, which latter has an internal surface reflecting the light falling upon it.

Finally another embodiment of the invention may be as represented semi-schematically in FIG. 4, wherein the luminous safety device comprises a button 61 with a translucent lower portion thereof 62 corresponding to that portion of the button sleeve which engages with the upper threaded portion 25 of safety lock actuating rod 18, button 61 including a head 63 which is hollow and the inside covered with reflecting material 64 illuminated by the incidence thereon of a light beam produced by lamp 65 turned on by microswitch 66 activated by the end 67 of safety lock mechanism. Thus microswitch 66 closes the circuit which includes a power source 29 when the safety lock is not engaged, that is, when safety lock actuator rod 18 is in its raised position; at this moment lamp 65, which is located inside the door 68 of the vehicle, partially shown, lights and rays therefrom pass through transparent portion 62 of button 61 and are reflected by the reflective covering 64, thus luminously indicating to the user that the safety lock is not engaged.

While the foregoing description refers to certain specific embodiments of the invention, it will be understood by those well-versed in the subject that changes in form or detail such as the location of the light sources, operation of the electric circuit or the shape of the actuating button are comprehended within the scope of the invention.

I claim:

1. A luminous safety device for vehicle doors comprising:
    an orifice in the door of the vehicle,
    an acuating rod having one end attached to the safety lock mechanism and having the other end threaded,
    a push-pull button connected to the said threaded end of the said rod with a head portion having translucent walls and a sleeve portion which engages the threaded portion of the said rod and passes through the said orifice in said vehicle door,
    an electric circuit comprising a light source for illuminating said push-pull button, and switch means actuated by said push-pull button for energizing said light source when said push-pull button is in a given position.

2. A vehicle door safety device in accordance with claim 1, wherein is included a hollow tubular shell of electrically insulating material which is secured by its upper end to the orifice in the door, a conducting strip inserted in the said shell and extending slightly inside said shell and being connected to a power source, the said sleeve portion of the push-pull button having at its lower end an electrically conducting ring,
    a lamp connected at one of its poles to the said electrically conducting ring and connected at the other of its poles to the said actuating rod which is connected to ground,
    spring means which electrically connects one end of the said actuating rod to one pole of the lamp.

3. A luminous safety device for vehicle doors in accordance with claim 2, wherein the said switch means consists of the said strip extending into the inside of the said shell, and the said ring secured to said sleeve portion of said push-pull button.

4. A luminous safety device for vehicle doors as set forth in claim 1, wherein the push-pull button comprises:
    a lamp connected to the threaded end of the actuator rod with a head portion having translucent walls which has one of the poles of the incandescent filament electrically connected to the said actuating rod connected to ground, and an electrically conducting ring connected to the other pole of the incandescent filament, and including a hollow shell of electrically insulating material surrouding the push-pull button connected at its upper end to the orifice of the said door, the lamp including a translucent head portion and a sleeve portion on which is mounted the electrically conducting ring and spring means which provide structural and electrical connection between the end of said actuator rod and the pole of the said lamp.

5. A luminous safety device for vehicle doors as claimed in claim 4, wherein the said switch means is composed of the said strip extending into the inside of the said shell, and the said ring secured to the sleeve portion of the said push-pull button.

6. A luminous safety device for vehicle doors as claimed in claim 1, wherein the said push-pull button has on the said sleeve portion a first electrically conducting ring which extends slightly outside of the exterior diameter of the said sleeve portion, this ring being connected to one of the poles of the said lamp which has its other pole connected to a second ring mounted on the sleeve portion at the lower end thereof and extending slightly outward, and a third ring which is insulatedly fixed upon and supported by the said actuator rod, the third ring being connected electrically and solidly to the said second ring, and to a power source, the said orifice in the door having an inside diameter practically the same as that of the sleeve portion of the push-pull button and being connected to ground.

7. A luminous safety device for vehicle doors as claimed in claim 1, wherein the push-pull button is made of transparent material and has an internal reflective covering in the upper portion of the said head, and a lamp inside the said door not connected to said push-pull button which, when the said button is pulled, is turned on by a switch means activated by the end portion of the said safety lock mechanism, so that the light from the lamp passes through the said push-pull button and is reflected by the same reflective covering.

* * * * *